(12) United States Patent
Ma et al.

(10) Patent No.: US 9,597,633 B2
(45) Date of Patent: Mar. 21, 2017

(54) AIR PREHEATING AND NOX REDUCTION INTEGRATED REACTOR AND REACTION METHOD

(71) Applicant: SHANDONG UNIVERSITY, JiNan, Shangdong (CN)

(72) Inventors: Chunyuan Ma, Shangdong (CN); Xingxing Cheng, Shangdong (CN); Zhiqiang Wang, Shangdong (CN); Tao Wang, Shangdong (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 14/762,313

(22) PCT Filed: Aug. 22, 2014

(86) PCT No.: PCT/CN2014/084989
§ 371 (c)(1),
(2) Date: Jul. 21, 2015

(87) PCT Pub. No.: WO2015/184688
PCT Pub. Date: Dec. 10, 2015

(65) Prior Publication Data
US 2015/0360175 A1    Dec. 17, 2015

(30) Foreign Application Priority Data

Jun. 5, 2014 (CN) .......................... 2014 1 02467723
Jun. 5, 2014 (CN) .................... 2014 2 02978298 U

(51) Int. Cl.
*C01B 33/26* (2006.01)
*B01D 53/86* (2006.01)

(52) U.S. Cl.
CPC .... *B01D 53/8631* (2013.01); *B01D 2251/202* (2013.01); *B01D 2251/204* (2013.01);
(Continued)

(58) Field of Classification Search
None
See application file for complete search history.

(56) References Cited

U.S. PATENT DOCUMENTS 5,397,548 A * 3/1995 Kritzler .............. B01D 53/8631
165/5

* cited by examiner

*Primary Examiner* — Jennifer A Smith
*Assistant Examiner* — Anita Nassiri Motlagh
(74) *Attorney, Agent, or Firm* — Oliff PLC

(57) ABSTRACT

An air preheating and denitration integrated reactor and reaction method. The reactor includes a rotary catalyst body, housing arranged outside the rotary catalyst body, and gas inlet and outlet channels on upper and lower surfaces of the housing; the gas inlet and outlet channel is in divided three, namely flue gas, reductant, and air inlet and outlet channels, the rotary catalyst body is cylindrical and includes a central shaft rotor and multiple circular catalyst layers rotate around the central shaft rotor, each circular catalyst layer is divided into air, flue gas and reductant zones by a radial sealing plate and axial sealing plate. In each circular catalyst layer, a catalyst in the reactor alternately circulates in flue gas, reductant and air zones. The catalyst performs heating-reheating-cooling process on catalyst layers along with the reactor rotation, different temperatures and reaction atmospheres in zones conductive of air preheating and denitration.

9 Claims, 2 Drawing Sheets

(52) U.S. Cl.
CPC ............... *B01D 2251/208* (2013.01); *B01D 2255/20738* (2013.01); *B01D 2255/20761* (2013.01); *B01D 2258/0283* (2013.01)

AIR PREHEATING AND NOX REDUCTION INTEGRATED REACTOR AND REACTION METHOD

FIELD OF THE INVENTION

The present invention relates to a novel air preheating and denitration integrated reactor and a reaction method, specifically relates to a technology for air preheating and removal of NOx in flue gas of a boiler and belongs to the field of innovations in energy-saving and emission-control technologies of the boilers.

BACKGROUND OF THE INVENTION

An air preheater and a flue gas NOx reduction (deNOx) reactor are two essential parts of an existing coal-fired boiler, in particular a flue gas treatment device of a coal-fired power station boiler.

The main effect of the air preheater is to use flue gas to preheat air entering the boiler to a certain temperature, thereby recovering heat of the flue gas and reducing the temperature of the flue exhausted from the boiler; and meanwhile, as the air is preheated, the initial temperature of fuel and the air is improved, the ignition and combustion process of the fuel is strengthened, the incomplete combustion loss of the fuel is reduced and the efficiency of the boiler is further improved.

In the aspect of NOx removal of the flue gas, in accordance with regulations stipulated in *Emission Standard of Air Pollutants for Thermal Power Plants* (GB13223-2011 in China) launched on Jan. 1, 2012, the emission of NOx of all the newly built thermal power units should achieve 100 mg/cm$^3$. Since Jan. 1, 2014, the emission of NOx of all the thermal power units put into operation in key regions has been required to achieve 100 mg/cm$^3$, and the emission of NOx of the units put into operation before 2003 in non-key regions has been required to achieve 200 mg/cm$^3$. The implementation of the new standard has brought great pressure to thermal power enterprises, and the control of nitrogen oxides has also become urgent objective requirement for national economic sustained development and environmental protection. At present, catalytic reduction NOx technology (SCR) has become a flue gas NOx treatment technology which is most widely used in the world, most mature and most effective. According to the technology, ammonia is taken as a reductant and sprayed into the flue for fully mixing with the flue gas and then flows into a reactor loading an SCR catalyst, and under the action of the catalyst, NOx in the flue gas is reduced to harmless nitrogen by the reductant, namely ammonia. At present, the SCR reactor has been widely used in the coal-fired power station boilers.

The air preheater and the SCR deNOx reactor are conventional flue gas treatment devices of the power station boilers, occupying a relatively large space and need relatively high investment and operation cost.

SUMMARY OF THE INVENTION

The present invention aims at providing an air preheating and deNOx integrated reactor and a reaction method. In the reactor, preheating of cold air can be achieved by cooling hot flue gas, the NOx reduction of the flue gas is simultaneously realized. The utilization of afterheat of the flue gas and the deNOx purification treatment of the flue are simultaneously performed, thereby improving the compactness of a flue gas treatment device of a coal-fired boiler and reducing investment and operation cost.

The technical scheme adopted by the invention is as follows:

an air preheating and NOx reduction integrated reactor includes a rotary catalyst body structure and a housing arranged outside the rotary catalyst body structure, as well as a gas inlet and outlet channel on the upper surface and the lower surface of the housing, wherein the gas inlet and outlet channel is divided into three parts, namely a flue gas inlet and outlet channel, a reductant inlet and outlet channel and an air inlet and outlet channel, the rotary catalyst body structure is cylindrical and includes a central shaft rotor and multiple circular catalyst layers which can rotate around the central shaft rotor, each circular catalyst layer is divided into an air zone, a flue gas zone and a reductant zone by a radial sealing plate and an axial sealing plate, the air zone of each circular catalyst layer is longitudinally through and has the size corresponding to the air inlet and outlet channel, the flue gas zone of each circular catalyst layer is longitudinally through and has the size corresponding to the flue gas inlet and outlet channel, the reductant zone of each circular catalyst layer is longitudinally through and has the size corresponding to the reductant inlet and outlet channel, the gas inlet and outlet channel is fixed on the housing, and the housing does not rotate along with the central shaft rotor.

A honeycomb catalyst is vertically loaded on each circular catalyst layer. Each honeycomb catalyst includes two parts, namely a metal support framework and a catalyst coating. The metal support framework adopts a steel plate and is of a honeycomb structure. The catalyst coating is uniformly coated on the surface of the metal support framework, the catalyst adopts a non-precious metal catalyst, such as Fe or Cu and the like, the metal can be loaded on a molecular sieve, aluminum oxide and other silicon aluminum oxide carriers, and the cost is relatively low.

Transition zones are arranged at the joints of every two of the air zones, the flue gas zones and the reductant zones for transition.

The fan-shaped region of each flue gas zone is 160°±10°, the fan-shaped region of each air zone is 120°±10° and the fan-shaped region of each reductant zone is 40°±10°. The angle of each fan-shaped region can be adjusted according to the type of the catalyst, the temperature of the flue gas and other specific settings. The fan-shaped region of each transition zone is 10°-20°.

The driving way of the rotary catalyst body structure can adopt peripheral driving or central shaft driving. An axial seal and a radial seal should be added between the housing and the rotary catalyst body structure to reduce air leakage between the various zones.

A gas inlet part of the reactor is fixed, and the flue gas, the reductant and the air respectively enter different fan-shaped regions of the reactor. The rotary catalyst body structure loaded with the catalysts rotates continuously and alternately circulates in the flue gas zones, the reductant zones and the air zones.

A method for performing air preheating and denitration integrated reaction by using the reactor is as follows: the catalyst alternately circulates in the flue gas zone, the reductant zone and the air zone during rotation, the catalyst layer rotates to the flue gas zone, the temperature of flue gas at an inlet is 300-350° C., the catalyst is heated by the flue gas, then the temperature of the flue gas is reduced to 120-150° C. and NOx in the flue gas is simultaneously adsorbed onto the surface of the catalyst; then the catalyst continuously rotates to the reductant zone, the temperature of reductant gas at the inlet is 350-600° C., the catalyst is further heated by the reductant gas, and NOx adsorbed on the surface of the catalyst is simultaneously reduced by the reductant gas and removed from the surface of the catalyst; finally, the catalyst rotates to the air zone, the temperature of air at the inlet is normal temperature, the catalyst is cooled by the cold air, the cold air is simultaneously heated to 120-200° C., and residual NOx on the surface of the catalyst will also be carried into a furnace chamber by the air to participate in the combustion process; and the catalyst also rotates back to the air zone along with the reactor to perform the next round of the heating-reheating-cooling process of the catalyst layer, namely adsorption-reduction and desorption-redesorption process of NOx.

The flue gas and the reductant enter from the upper part of the reactor and flow out of the reactor from the lower part; and the air enters from the lower part of the reactor and flows out of the reactor from the upper part.

The reductant gas adopts fuel type gas, such as one or the combination of several of a series of reducing gas, including hydrogen ($H_2$), carbon monoxide (CO), methane ($CH_4$), ethane ($C_2H_6$), ethylene ($C_2H_4$), propane ($C_3H_8$), propylene ($C_3H_6$), butane ($C_4H_{10}$), butene ($C_4H_8$), and the reductant can be diluted by nitrogen gas, and the concentration range of the fuel gas is 1-20%.

The range of volume flow rate ratio of the reductant gas to the flue gas is (1:20)-(1:400).

In each circular catalyst layer, the catalyst in the reactor provided by the invention alternately circulates in the flue gas zone, the reductant zone and the air zone. The catalyst performs the heating-reheating-cooling process of the catalyst layer, namely the adsorption-reduction and desorption-redesorption process of NOx along with the rotation of the reactor. Different temperatures and reaction atmospheres in all the zones are conductive to the proceeding of air preheating and denitration process, thereby improving the denitration efficiency of the whole reactor. In comparison with a flue gas treatment system which arranges the air preheater and the denitration reactor separately, the volume of the air preheating and denitration integrated device is about 1.2-1.5 times of that of the independent rotary air preheater, the investment cost is 50%-75% of that of the system adopting a separate arrangement, and the operation cost is 60-80% of that of the system adopting the separate arrangement. Meanwhile, the expected air preheating effect is equivalent to that of the independent rotary air preheater, and the denitration efficiency can achieve about 90% at the same time.

DETAILED DESCRIPTION OF THE EMBODIMENTS

Figure 1:
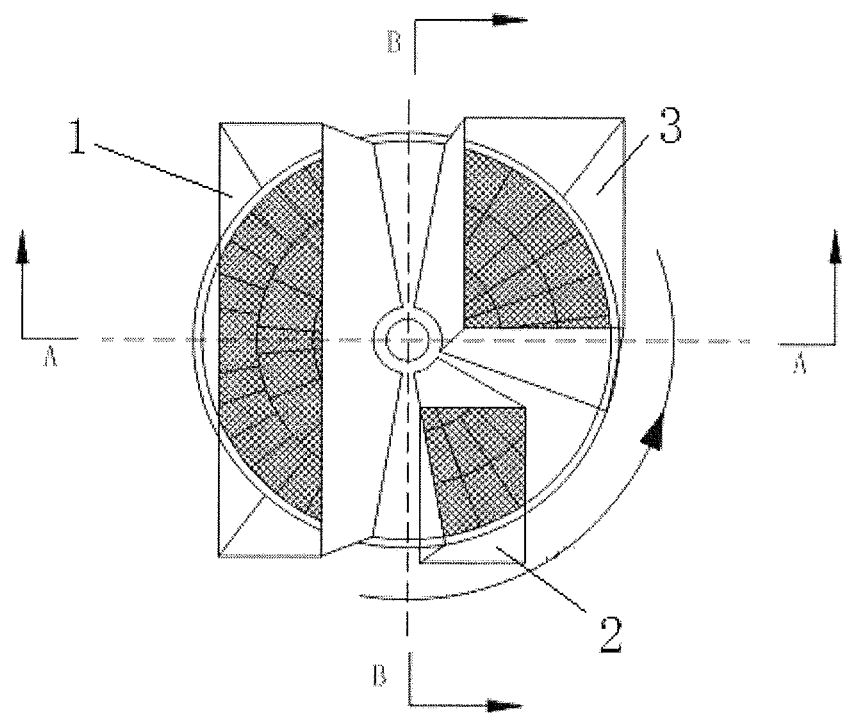
FIG. 1 is a structural diagram of an air preheating and denitration integrated reactor of the invention.
Figure 2:
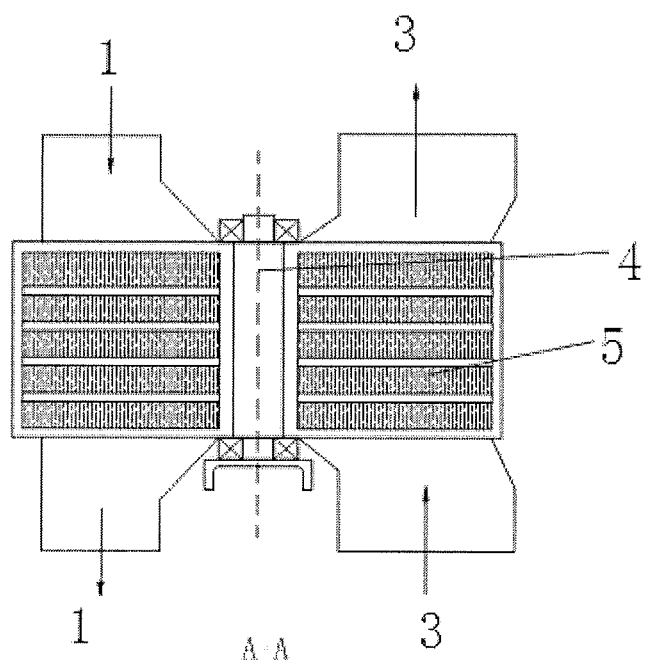
FIG. 2 is an A-A side section view of FIG. 1.
Figure 3:
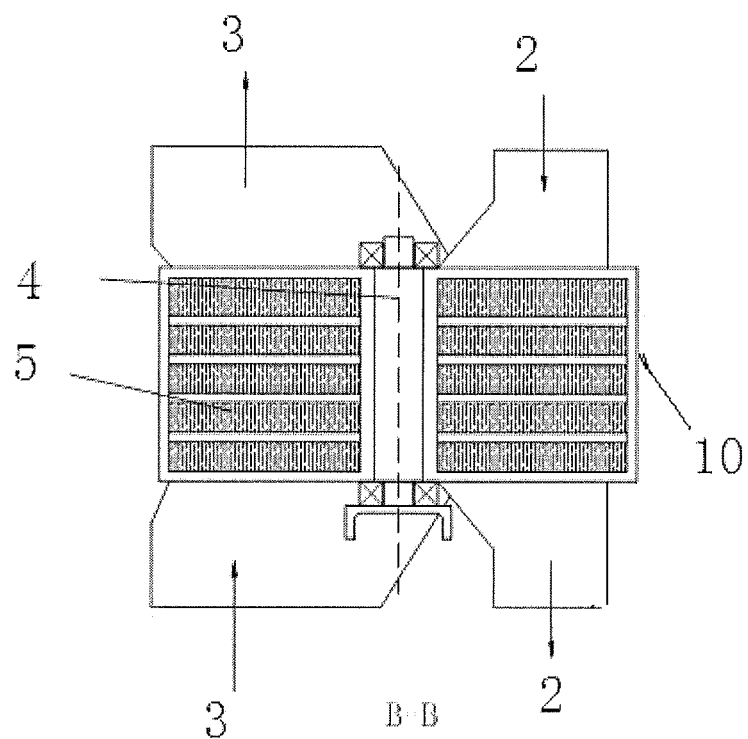
FIG. 3 is a B-B side section view of FIG. 1.
Figure 4:
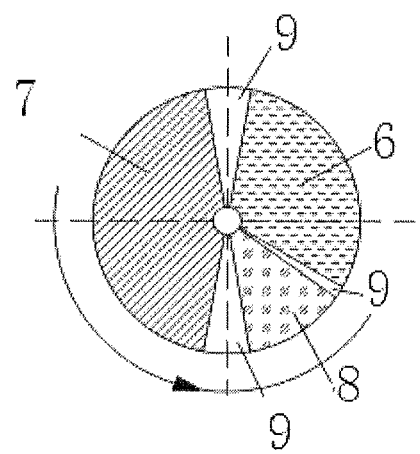
FIG. 4 is a zonal schematic diagram of a catalyst layer.
Wherein, 1: flue gas inlet and outlet channel, 2: reductant inlet and outlet channel, 3: air inlet and outlet channel; 4: central shaft rotor; 5: circular catalyst layer; 6: air zone; 7: flue gas zone; 8: reductant zone; 9: transition zone; and 10: housing.

The present invention is further described below in conjunction with embodiments.

Embodiment 1

An air preheating and denitration integrated reactor includes a rotary catalyst body structure and a housing 10 arranged outside the rotary catalyst body structure, as well as a gas inlet and outlet channel on the upper surface and the lower surface of the housing 10, wherein the gas inlet and outlet channel is divided into three parts, namely a flue gas inlet and outlet channel 1, a reductant inlet and outlet channel 2 and an air inlet and outlet channel 3, the rotary catalyst body structure is cylindrical and comprises a central shaft rotor 4 and multiple circular catalyst layers 5 which can rotate around the central shaft rotor, each circular catalyst layer is divided into an air zone 6, a flue gas zone 7 and a reductant zone 8 by a radial sealing plate and an axial sealing plate, the air zone 6 of each circular catalyst layer is longitudinally through and has the size corresponding to the air inlet and outlet channel 3, the flue gas zone 7 of each circular catalyst layer is longitudinally through and has the size corresponding to the flue gas inlet and outlet channel 1, the reductant zone 8 of each circular catalyst layer is longitudinally through and has the size corresponding to the reductant inlet and outlet channel 2, the gas inlet and outlet channel is fixed on the housing 10, and the housing does not rotate along with the central shaft rotor.

A gas inlet part of the reactor is divided into three strands for enabling flue gas, a reductant and air to enter the reactor respectively. The gas inlet part of the reactor is fixed, and the flue gas, the reductant and the air respectively enter different fan-shaped regions of the reactor. The fan-shaped region which the flue gas enters is 160° and is called as the flue gas zone 7; the fan-shaped region which the air enters is 120° and is called as the air zone 6; and the fan-shaped region which the reductant enters is 40° and is called as the reductant zone 8. The angle of each fan-shaped region can be adjusted according to the type of the catalyst, the temperature of the flue gas and other specific settings, and the adjustment amplitude is ±10°. Transition zones 9 exist between the air zone, the flue gas zone and the reductant zone respectively, and the fan-shaped region of each transition zone 9 is 10°-20°.

The driving way of the rotary catalyst body structure can adopt peripheral driving or central shaft driving. An axial seal and a radial seal should be added in the reactor to reduce air leakage between various zones. A rotating shaft is mounted at the center of the rotary catalyst body structure, the rotary catalyst body structure can rotate around the central shaft, and the catalyst layers loaded in the fan-shaped regions rotate accordingly.

A honeycomb catalyst is vertically loaded on each circular catalyst layer. Each honeycomb catalyst comprises two parts, namely a metal support framework and a catalyst coating. The metal support framework adopts a steel plate and is of a honeycomb structure. The catalyst coating is uniformly coated on the surface of the metal support framework, the catalyst adopts a non-precious metal catalyst, such as Fe or Cu and the like, the metal can be loaded on a molecular sieve, aluminum oxide and other silicon aluminum oxide carriers, and the cost is relatively low.

The flue gas and the reductant enter from the upper part of the reactor and flow out of the reactor from the lower part; and the air enters from the lower part of the reactor and flows out of the reactor from the upper part. The reductant gas adopts fuel type gas, such as one or the combination of several of a series of reducing gas, including hydrogen ($H_2$), carbon monoxide (CO), methane ($CH_4$), ethane ($C_2H_6$), ethylene ($C_2H_4$), propane ($C_3H_8$), propylene ($C_3H_6$), butane ($C_4H_{10}$), butene ($C_4H_8$), and the reductant can be diluted by nitrogen gas, and the concentration range of the fuel gas is 1-20%. The range of volume flow rate ratio of the reductant gas to the flue gas is (1:20)-(1:400).

Firstly, in each circular catalyst layer, the catalyst layer rotates to the flue gas zone, the temperature of the flue gas at an inlet is 300-350° C., the catalyst is heated by the flue gas, then the temperature of the flue gas is reduced to 120-150° C. and NOx in the flue gas is simultaneously adsorbed onto the surface of the catalyst. Then, the catalyst continuously rotates to the reductant zone, the temperature of the reductant gas at the inlet is 350-600° C., the catalyst is further heated by the reductant gas, and NOx adsorbed onto the surface of the catalyst is simultaneously reduced by the reductant gas and removed from the surface of the catalyst. Finally, the catalyst rotates to the air zone, the temperature of the air at the inlet is normal temperature, namely 10-30° C., the catalyst is cooled by the cold air, the cold air is simultaneously heated to 120-200° C., and residual NOx on the surface of the catalyst will also be carried into a furnace chamber by the air to participate in the combustion process. Thus, the catalyst rotates back to the air zone along with the reactor and performs the next round of the heating-reheating-cooling process of the catalyst layer.

The invention claimed is:

1. An air preheating and denitration integrated reactor, comprising a rotary catalyst body structure and a housing arranged outside the rotary catalyst body structure, as well as a gas inlet and outlet channel on the upper surface and the lower surface of the housing, wherein the gas inlet and outlet channel is divided into three parts, namely a flue gas inlet and outlet channel, a reductant inlet and outlet channel and an air inlet and outlet channel, the rotary catalyst body structure is cylindrical and comprises a central shaft rotor and multiple circular catalyst layers which can rotate around the central shaft rotor, each circular catalyst layer is divided into an air zone, a flue gas zone and a reductant zone by a radial sealing plate and an axial sealing plate, the air zone of each circular catalyst layer is longitudinally through and has the size corresponding to the air inlet and outlet channel, the flue gas zone of each circular catalyst layer is longitudinally through and has the size corresponding to the flue gas inlet and outlet channel, the reductant zone of each circular catalyst layer is longitudinally through and has the size corresponding to the reductant inlet and outlet channel, the gas inlet and outlet channel is fixed on the housing, and the housing does not rotate along with the central shaft rotor.

2. The air preheating and denitration integrated reactor according to claim 1, wherein a honeycomb catalyst is vertically loaded on each circular catalyst layer, and each honeycomb catalyst comprises two parts, namely a metal support framework and a catalyst coating, wherein the metal support framework adopts a steel plate and is of a honeycomb structure, and the catalyst coating is uniformly coated on the surface of the metal support framework.

3. The air preheating and denitration integrated reactor according to claim 1, wherein transition zones are arranged at the joints of every two of the air zones, the flue gas zones and the reductant zones for transition.

4. The air preheating and denitration integrated reactor according to claim 3, wherein the fan-shaped region of each transition zone is 10°–20°.

5. The air preheating and denitration integrated reactor according to claim 1, wherein the fan-shaped region of each flue gas zone is 160°±10°, the fan-shaped region of each air zone is 120°±10° and the fan-shaped region of each reductant zone is 40°±10°.

6. The air preheating and denitration integrated reactor according to claim 1, wherein an axial seal and a radial seal should be added between the housing and the rotary catalyst body structure.

7. A method for performing air preheating and denitration integrated reaction by using the reactor according to claim 1, wherein the catalyst alternately circulates in the flue gas zone, the reductant zone and the air zone during rotation, the catalyst layer rotates to the flue gas zone, the temperature of flue gas at an inlet is 300-350° C., the catalyst is heated by the flue gas, then the temperature of the flue gas is reduced to 120-150° C. and NOx in the flue gas is simultaneously adsorbed onto the surface of the catalyst; then the catalyst continuously rotates to the reductant zone, the temperature of reductant gas at the inlet is 350-600° C., the catalyst is further heated by the reductant gas, and NOx adsorbed onto the surface of the catalyst is simultaneously reduced by the reductant gas and removed from the surface of the catalyst; finally, the catalyst rotates to the air zone, the temperature of air at the inlet is normal temperature, the catalyst is cooled by the cold air, the cold air is simultaneously heated to 120-200° C., and residual NOx on the surface of the catalyst will also be carried into a furnace chamber by the air to participate in the combustion process; and the catalyst also rotates back to the air zone along with the reactor to perform the next round of the heating-reheating-cooling process of the catalyst layer, namely adsorption-reduction and desorption-redesorption process of NOx.

8. The method for air preheating and denitration integrated reaction according to claim 7, wherein the flue gas and the reductant enter from the upper part of the reactor and flow out of the reactor from the lower part; and the air enters from the lower part of the reactor and flows out of the reactor from the upper part.

9. The method for air preheating and denitration integrated reaction according to claim 7, wherein the range of volume flowrate ratio of the reductant gas to the flue gas is (1:20)-(1:400).

* * * * *